(12) United States Patent
Kim et al.

(10) Patent No.: US 11,116,370 B2
(45) Date of Patent: Sep. 14, 2021

(54) CLEANING ROBOT

(71) Applicant: LG ELECTRONICS INC., Seoul (KR)

(72) Inventors: Hanshin Kim, Seoul (KR); Jaehoon Jeong, Seoul (KR); Dongkyun Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 15/858,702

(22) Filed: Dec. 29, 2017

(65) Prior Publication Data

US 2018/0184864 A1 Jul. 5, 2018

(30) Foreign Application Priority Data

Dec. 30, 2016 (KR) .................. 10-2016-0184321

(51) Int. Cl.
*A47L 9/00* (2006.01)
*B25J 11/00* (2006.01)
*B25J 5/00* (2006.01)
*A47L 9/02* (2006.01)
*B25J 19/00* (2006.01)

(52) U.S. Cl.
CPC .............. *A47L 9/009* (2013.01); *A47L 9/02* (2013.01); *B25J 5/007* (2013.01); *B25J 11/0085* (2013.01); *B25J 19/0062* (2013.01); *A47L 2201/04* (2013.01)

(58) Field of Classification Search
CPC ........ A47L 9/009; A47L 9/02; A47L 2201/04; B60R 21/0136; G01R 33/07; B25J 5/007; B25J 11/0085; B25J 19/0062

USPC ........................................... 15/319
See application file for complete search history.

(56) References Cited

U.S. PATENT DOCUMENTS

| 6,302,615 | B1 * | 10/2001 | Kleiner | .............. | B60G 7/005 |
| | | | | | 403/133 |
| 6,999,850 | B2 * | 2/2006 | McDonald | .............. | A47L 9/009 |
| | | | | | 318/567 |
| 2002/0163432 | A1 * | 11/2002 | Higgins | .............. | E03C 1/281 |
| | | | | | 340/540 |
| 2010/0037418 | A1 * | 2/2010 | Hussey | .............. | A47L 5/30 |
| | | | | | 15/319 |

(Continued)

FOREIGN PATENT DOCUMENTS

| JP | H1085465 A | * | 4/1998 | ............. A63H 17/26 |
| JP | 2006072502 A | * | 6/2006 | |
| KR | 100765848 B1 | * | 10/2007 | |

OTHER PUBLICATIONS

Translations of KR100765848B1, retrieved from Espacenet on Jan. 15, 2021 (Year: 2007).*

(Continued)

*Primary Examiner* — Orlando E Aviles
*Assistant Examiner* — Thomas Raymond Rodgers
(74) *Attorney, Agent, or Firm* — Birch, Stewart, Kolasch & Birch, LLP

(57) ABSTRACT

A cleaning robot includes a cover, a fixed body provided in the cover, a traveling part connected to the fixed body, a movement frame fastened to the cover to move in correspondence with movement of the cover, an inner body configured to support the movement frame relative to the fixed body, and a rotator provided on a bottom of the inner body to rotate in correspondence with movement of the cover.

28 Claims, 10 Drawing Sheets

(56) References Cited

U.S. PATENT DOCUMENTS

| | | | | |
|---|---|---|---|---|
| 2014/0138964 A1* | 5/2014 | Shin | ................. | G01L 1/04 |
| | | | | 293/117 |
| 2016/0000282 A1* | 1/2016 | Vanderstegen-Drake | ................. | |
| | | | | A47L 9/009 |
| | | | | 280/6.157 |
| 2016/0073839 A1* | 3/2016 | Janzen | ................. | G05D 1/0227 |
| | | | | 15/3 |
| 2016/0309973 A1* | 10/2016 | Sheikh | ................. | A47L 11/4061 |

OTHER PUBLICATIONS

Translations of JPH1085465A, retrieved from Espacenet on Jan. 15, 2021 (Year: 1998).*
Translations of JP2006072502, retrieved from Espacenet on Jan. 15, 2021 (Year: 2006).*
Superior Industries data sheet, from Wayback machine (Year: 2015).*

* cited by examiner

CLEANING ROBOT

CROSS-REFERENCE TO RELATED APPLICATIONS

This application claims priority under 35 U.S.C. 119 and 365 to Korean Patent Application No. 10-2016-0184321, filed on Dec. 30, 2016 in the Korean Intellectual Property Office, the disclosure of which is incorporated herein by reference.

FIELD

The present invention relates to a cleaning robot for performing cleaning operation while traveling about a specific place such as an airport.

BACKGROUND

Recently, with development of autonomous traveling technology and automatic control technology, functions of a traveling device and, more particularly, a robot have been increased.

Each technology will now be described. Autonomous traveling technology refers to technology for enabling a machine to autonomously move to avoid an obstacle. According to autonomous traveling technology, a robot autonomously recognizes a position thereof through a sensor and moves to avoid an obstacle.

Automatic control technology refers to technology for enabling a machine to feed values measured by examining the state of the machine back to a control device to automatically control operation of the machine. Accordingly, the machine can be controlled without human manipulation and can be automatically controlled to be positioned within a target range, that is, to reach a target point.

With development and combination of the above-described technologies, an intelligent robot can be implemented and a variety of information and services can be provided through the intelligent robot.

The robot is generally applicable to industrial fields, medical fields, space-related fields and ocean-related fields. For example, a robot may perform repeated operation in machining processes such as automobile production. That is, when a person inputs an operation to be performed, industrial robots repeat the received operation.

In addition, technology for mounting a camera in a robot was conventionally implemented. A robot may recognize a position thereof or an obstacle using a camera. In addition, a captured image can be displayed on a display unit.

SUMMARY

An object of the present embodiment is to provide a cleaning robot capable of efficiently performing bumping operation of a cover by a bumping tool upon applying external force to a main-body cover or upon occurrence of collision with the main-body cover.

According to an aspect of the present embodiment, a cleaning robot includes a cover forming appearance of the cleaning robot, a fixed body provided in the cover, a movement frame fastened to the cover, an inner body configured to support the movement frame relative to the fixed body, and a rotator provided on a bottom of the inner body to rotate in correspondence with movement of the cover.

In some embodiments, a rotator reception part for receiving the rotator may be provided on the bottom of the inner body, and a lubricant may be applied between the rotator reception part and the rotator According to another aspect of the present embodiment, a flow layer for reducing friction with the fixed body or a plate fixed to the fixed body when the inner body moves may be provided between the inner body and the fixed body. For example, the flow layer may be made of polyoximethylene (POM) or acrylonitrile butadiene styrene (ABS).

Accordingly, a cleaning robot according to the invention may include a fixed body, a traveling part provided at a lower portion of the fixed body to enable the cleaning robot to move along a floor surface, a suction part provided at the fixed body to suck foreign materials from the floor surface, a cover surrounding the fixed body, the cover being configured to receive an external force. a movement frame supporting the cover, the movement frame being movable together with the cover horizontally with respect to the fixed body, an inner body supporting the movement frame relative to the fixed body, and a rotator provided on a bottom side of the inner body, the rotator being configured to rotate upon movement of the cover to reduce friction between the inner body and the fixed body.

The traveling part may include a plurality of wheels.

The cleaning robot may include a side brush protruding from a front lower end of the cover.

The cleaning robot may include a rotator reception part provided on the bottom side of the inner body to receive the rotator. At least a portion of the rotator may be exposed through a lower portion of the rotator reception part. The cleaning robot may include a lubricant applied between the rotator reception part and the rotator. The rotator reception part may include a plurality of rotator reception parts provided along an outer periphery of the bottom side of the inner body. The inner body may be made of an aluminum material.

The cleaning robot may include a flow layer provided between the inner body and the fixed body to reduce friction between the inner body and the fixed body. The flow layer may include any one of polyoximethylene (POM) and acrylonitrile butadiene styrene (ABS).

The cleaning robot may include a movement shaft connecting the movement frame to the inner body, and a plate provided on the fixed body, wherein the rotator contacts an upper surface of the plate.

The cleaning robot may include a first elastic member connected between the movement frame and the fixed body for biasing the movement frame in a first direction, and a second elastic member connected between the movement frame and the fixed body for biasing the movement frame in a second direction.

Also, a cleaning robot according to the invention may include a fixed body, a traveling part provided at a lower portion of the fixed body to enable the cleaning robot to move along a floor surface, a suction part provided at the fixed body to suck foreign materials from the floor surface, a cover surrounding the fixed body, the cover being configured to receive an external force, a movement frame supporting the cover, the movement frame being movable together with the cover horizontally with respect to the fixed body, an inner body supporting the movement frame relative to the fixed body, and a flow layer provided between the inner body and the fixed body to reduce friction between the inner body and the fixed body upon movement of the cover.

The cleaning robot may include a holder providing a reception space to receive the inner body therein, wherein the flow layer is provided in the reception space.

The cleaning robot may include a movement shaft connecting the movement frame to the inner body, and a plate provided on the fixed body, wherein the flow layer is provided on an upper surface of the plate.

Finally, a cleaning robot according to the invention may include a fixed body, a plurality of wheels provided at a lower portion of the fixed body to enable the cleaning robot to move along a floor surface, a suction part provided at the fixed body to suck foreign materials from the floor surface, a cover surrounding the fixed body, the cover being configured to receive an external force, a movement frame supporting the cover, the movement frame being movable together with the cover horizontally with respect to the fixed body, an inner body supporting the movement frame relative to the fixed body, a movement shaft connecting the movement frame to the inner body, a plurality of rotators provided on a bottom side of the inner body, the rotators being configured to rotate upon movement of the cover to reduce friction between the inner body and the fixed body, a plate provided on the fixed body, a flow layer provided on an upper surface of the plate to reduce friction between the rotators and the fixed body upon movement of the cover, and at least one elastic member connected between the movement frame and the fixed body for biasing the movement frame in a first direction.

DETAILED DESCRIPTION OF THE PREFERRED EMBODIMENT

A traveling device refers to a device which can move from a specific position to another position using power. The traveling device may be divided into an automatic traveling device and a manual traveling device. The automatic traveling device may refer to a traveling device which autonomously travels along a predetermined path without user manipulation. As an example of the traveling device, there is a movable robot. The movable robot may perform various operations while moving using traveling parts, e.g., wheels or legs.

For convenience of description, in this specification, the present invention will be described using a cleaning robot. The cleaning robot may mean a robot for performing cleaning operation while moving about a specific region. For example, the cleaning robot may include an airport cleaning robot for performing cleaning operation while moving about a wide space such as an airport.

The present invention is not limited to the cleaning robot and is applicable to a traveling device including a cleaning robot.

Figure 1:
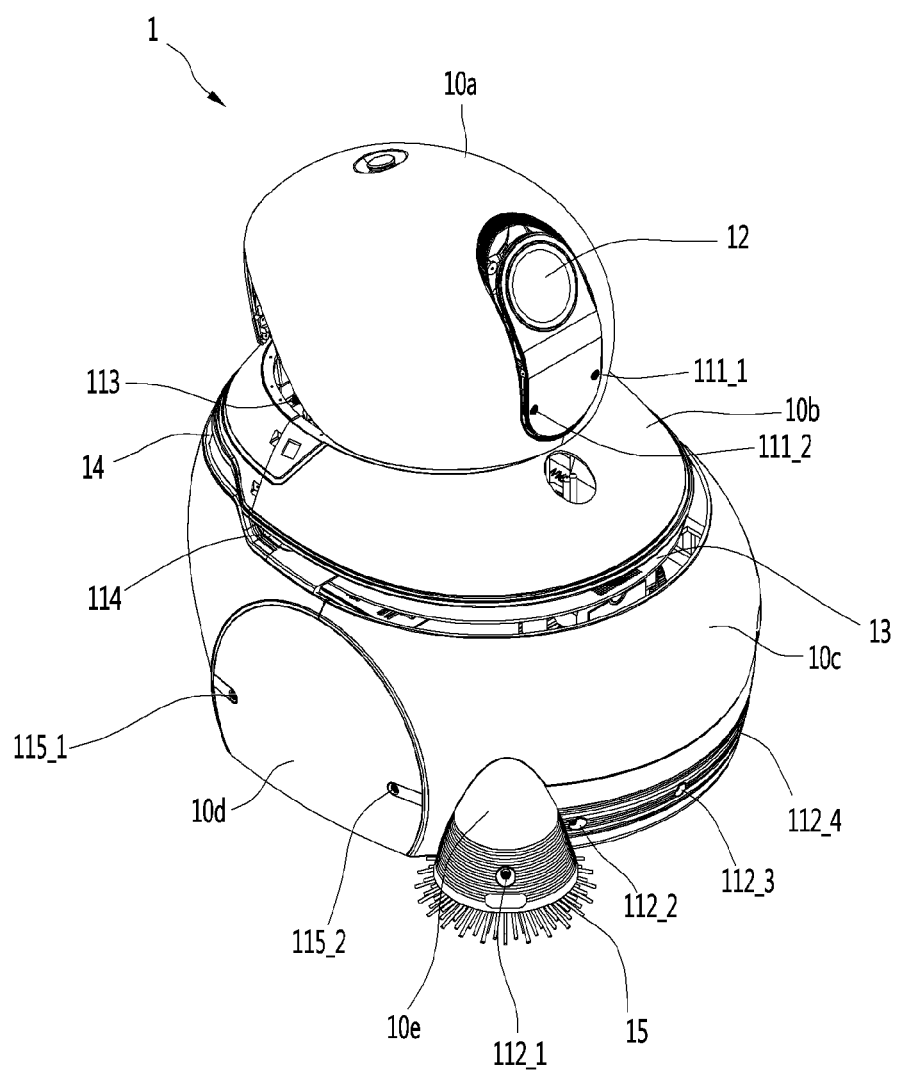
FIG. 1 is a diagram showing the appearance of a cleaning robot according to an embodiment of the present invention.

FIG. 1 is a diagram showing the appearance of a cleaning robot according to an embodiment of the present invention.

Figure 2:
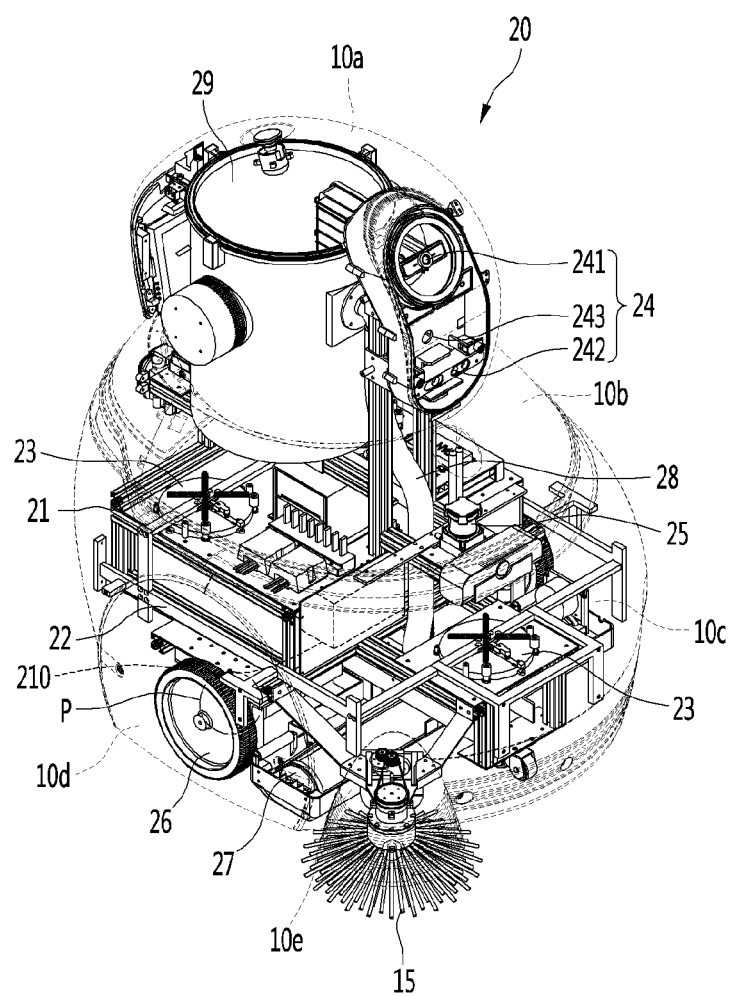
FIG. 2 is a perspective view showing a main body provided in a cleaning robot according to an embodiment of the present invention.

Referring to FIG. 1, the cleaning robot 1 includes covers 10a, 10b, 10c, 10d and 10e (collectively, 10) covering various components provided in a main body 20 (see FIG. 2). The cover 10 surrounds the outside of the main body 20 to form the appearance of the cleaning robot 1.

For example, the cover 10 may include a top cover 10a, a middle cover 10b provided below the top cover 10a and a bottom cover 10c provided below the middle cover 10b. The top cover 10a, the middle cover 10b and the bottom cover 10c may be integrally formed as one cover or may be separately formed as separate covers.

The top cover 10a may be located at the uppermost end of the cleaning robot 1. For example, the top cover 10a may be formed in a dome shape, without being limited thereto. The top cover 10a may include a light transmission unit 12 for enabling at least one camera provided in the main body 20 to capture the periphery (e.g., the front side) of the cleaning robot 1. The light transmission unit 12 may be placed at one side of a front surface of the top cover 10a. The light transmission unit 12 may be made of a material for transmitting light, such as glass, plastic, acryl, etc., without being limited thereto. The at least one camera may collect light reflected from objects located near the cleaning robot 1 and received through the light transmission unit 12, thereby capturing the objects located near the cleaning robot 1. For example, at least one camera may be used to recognize the face of a user or an obstacle located at the front side of the cleaning robot 1 or to sense the current position of the cleaning robot. The top cover 10a may be located at a height where the at least one camera can recognize the user's face or more accurately recognize the current position of the cleaning robot. For example, the top cover 10a may be located at a height (e.g., about 140 cm) less than the height of an adult.

The middle cover 10b may be provided below the top cover 10a. The width of the middle cover 10b may be gradually increased from the upper side to the lower side thereof. For example, if the middle cover 10b has a cylindrical shape, the diameter of the middle cover 10b may be increased from the upper side to the lower side thereof. In some embodiments, the middle cover 10b may be included in the top cover 10a. In this case, the cover 10 may be divided into a top cover (or a first cover) and a bottom cover (or a second cover) with respect to recessed parts 13 and 14.

The bottom cover 10c may be provided below the middle cover 10b. The bottom cover 10c may have a greater width than the top cover 10a and the middle cover 10b.

A battery, traveling parts (e.g., wheels), various boards (e.g., printed circuit boards (PCBs)), etc. may be received in the bottom cover 10c. In some embodiments, the bottom cover 10c may be formed to surround the outsides of the traveling parts 26 (see FIG. 2). In another embodiment, the bottom cover 10c may include traveling-unit covers 10d surrounding the outsides of the traveling parts 26. In another embodiment, if a side brush 15 protruding to a front lower end of the cleaning robot 1 is provided, the bottom cover 10c may be formed to surround the outside of the side brush 15. In some embodiments, the bottom cover 10c may further include a side-brush cover 10e surrounding the outside of the side brush 15.

The cover 10 may include a plurality of sensors 111_1 to 115_2 (collectively referred to as a sensor unit 11) for sensing whether an object is present within a predetermined distance from the cleaning robot 1. The sensor unit 11 may be provided at various positions of the top cover 10a, the middle cover 10b and the bottom cover 10c.

Meanwhile, the cover 10 may include a first recessed part 13 and a second recessed part 14. The first recessed part 13 and the second recessed part 14 may be recessed from the outside of the cover 10 to the inside of the robot. The top cover 10a and the middle cover 10b are positioned above the first recessed part 13 and the second recessed part 14 and the bottom cover 10c may be positioned below the first recessed part 13 and the second recessed part 14.

In particular, the cover 10 according to the embodiment of the present invention may serve as a bumper for protecting various components included in the main body 20 of the cleaning robot 1 and connected to the fixed body 21 (see FIG. 2) from external impact. To this end, since the cover 10 is not directly connected to the fixed body 21 of the cleaning robot 1, it is possible to minimize movement of the fixed body 21 and the various components connected to the fixed body 21 when the cover 10 is moved by external impact.

Figure 3:
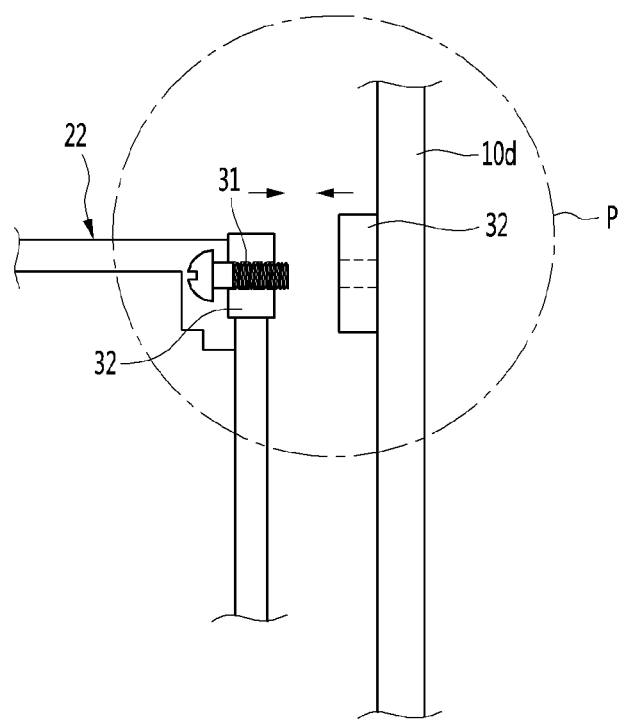
FIG. 3 is a diagram showing an example of a fastening structure between a cover and a movement frame of a cleaning robot according to an embodiment of the present invention.

FIG. 2 is a perspective view showing a main body provided in a cleaning robot according to an embodiment of the present invention, and FIG. 3 is a diagram showing an example of a fastening structure between a cover and a movement frame of a cleaning robot according to an embodiment of the present invention.

Referring to FIG. 2, the main body 20 of the cleaning robot 1 may include a fixed body 21, a movement frame 22, one or more elasticity setting parts 23 and traveling parts 26. The components shown in FIG. 2 are not essential in implementation of the main body 20 of the cleaning robot 1. Accordingly, the main body 20 of the cleaning robot 1 described in this specification may have more or fewer components than the above-described components.

Specifically, among the above-described components, the fixed body 21 may be connected to various parts necessary for operation of the cleaning robot 1 and the other components. In this specification, the fixed body 21 may include a frame configuring the main body 20. The fixed body 21 may be received in the cover 10. That is, the cover 10 may be formed to surround the outside of the fixed body 21.

The fixed body 21 may include various boards for controlling overall operation of the cleaning robot 1. For example, the fixed body 21 may include some or all of a main board for managing overall driving of the cleaning robot 1, a board for processing data collected through the sensor unit 11, the camera unit 24 and the lidar sensor 25 and/or a board for controlling operation for supplying power of the battery 210 to the components included in the cleaning robot 1. The battery 210 may be located in the fixed body 21.

The battery 210 may provide power necessary for operation of the cleaning robot 1 to various components.

In addition, the fixed body 21 may be connected to various components (e.g., a lidar sensor 25 and the traveling unit 26) necessary for operation of the cleaning robot 1. The detailed structure of the fixed body 21 will be described below with reference to FIG. 4.

The movement frame 22 is provided between the cover 10 and the fixed body 21 to support the cover 10 movably relative to the fixed body 21. The movement frame 22 may be fastened to the cover 10 at least one point P to support the cover 10 relative to the fixed body 21 while moving according to movement of the cover 10. For example, as shown in FIG. 3, the cover 10 (e.g., traveling-unit cover 10d) located at a fastening point P or the movement frame 22 may include a fastening boss 32 such that the cover 10 and the movement frame 22 are fastened to each other by a fastening screw 31 and the fastening boss 32. In some embodiments, the cover 10 or the movement frame 22 may include a plurality of fastening bosses such that the cover 10 and the movement frame 22 are fastened to each other at a plurality of points. The method of fastening the cover 10 and the movement frame 22 is not limited to the embodiment shown in FIG. 3 and various fastening methods may be used.

As described above with reference to FIG. 1, if the cover 10 includes the top cover 10a, the middle cover 10b and the bottom cover 10c (the bottom cover 10c includes the traveling-unit cover 10d), the movement frame 22 may be fastened to the bottom cover 10c and may not be fastened to the top cover 10a and the middle cover 10b. Accordingly, the movement frame 22 may move based on movement of the bottom cover 10c. However, in some embodiments, the movement frame 22 may be fastened to the top cover 10a or the middle cover 10b and, in this case, the movement frame 22 may move based on movement of the top cover 10a or the middle cover 10b.

In addition, the movement frame 22 may be connected to the fixed body 21 through the one or more elasticity setting parts 23 and, at the same time, may be supported relative to the fixed body 21. That is, since the movement frame 22 and the cover 10 are connected to the fixed body 21 through the elasticity setting parts 23, the elasticity setting parts 23 may be provided as fasteners between the cover 10 and the fixed body 21.

The one or more elasticity setting parts 23 may minimize delivery of external force to the fixed body 21 using an elastic member (e.g., a spring, etc.) having elastic force, even when the cover 10 and the movement frame 22 are moved by external force. That is, the elastic member may absorb external force applied to the cover 10 as elastic deformation. Accordingly, even when the cover 10 and the movement frame 22 are moved by external force, the fixed body 21 is not moved, thereby preventing various components connected or fixed to the fixed body 21 from being damaged or broken. In particular, since the elastic setting parts 23 are fixed to the fixed body 21 including a component having a large weight, such as the battery 210, the fixed body 21 may not be moved and only the elastic member may be stretched, upon applying external force.

In addition, the elastic setting parts 23 may elastically support the movement frame 22 relative to the fixed body 21. That is, after the cover 10 and the movement frame 22 are moved by external force, the elastic setting parts 23 may return and fix the movement frame 22 to and at a reference position using elastic force.

According to the embodiment of FIG. 5 to be described later, the main body 20 may include a first elasticity setting part 23a, a second elasticity setting part 23b, and a third elasticity setting part 23c respectively provided at the front side and lateral rear sides of the fixed body 21. The first to third elasticity setting parts 23a to 23c provided in the fixed body 21 may be arranged in a triangular shape when viewed from the top of the cleaning robot 1. Accordingly, the cover 10 and the movement frame 22 may be stably supported relative to the fixed body 21 by the first to third elasticity setting parts 23a to 23c.

The traveling parts 26 may be provided below the fixed body 21. For example, the traveling parts 26 may be connected to a lower fixed body 21e (referring to FIG. 4). Although wheels 26 are shown as an example of the traveling parts 26 in FIG. 2, the traveling parts 26 may include legs in another embodiment. In addition, although two wheels are provided at both sides of the cleaning robot in this specification, the number of wheels may be variously changed. The wheels 26 rotate based on rotation force applied by a driving unit (not shown), such that the cleaning body 1 travels. In some embodiments, a caster for aiding traveling of the cleaning robot 1 may be provided at the front or rear side of the cleaning robot 1.

In some embodiments, the cleaning robot 1 may further include a side brush 15 protruding to the front lower end of the cleaning robot, a camera unit 24 for capturing the front side of the cleaning robot, a lidar sensor 25 for sensing an object located in the front direction of the cleaning robot 1, a suction module 27 for sucking in foreign materials on the ground, a cleaning module 29 for collecting the sucked foreign materials and a suction pipe 28 provided between the suction module 27 and the cleaning module 29. For example, the camera unit 24 may include a simultaneous localization and mapping (SLAM) camera 241, a red, green, blue, distance (RGBD) camera 242, and a stereo camera (or stereoscopic camera 243. The suction module 27 may further include a driving motor for rotating an agitator and a timing belt. The cleaning module 29 may include a dust collection motor and a dust collector.

Using the various components of the main body 20 described with reference to FIG. 2, the cleaning robot 1 may perform cleaning operation while freely moving about a region of a specific place (e.g., an airport, etc.).

As described above, various components are included in the main body 20 of the cleaning robot 1. The cover 10 (more particularly, the bottom cover 10c) forming the appearance of the cleaning robot 1 may serve as a bumper for protecting the various components included in the main body 20 from external impact (e.g., collision with an obstacle, external force, etc.) occurring at various positions or in various directions. In order for the bottom cover 10c to serve as a bumper, the movement frame 22 may be fastened to the bottom cover at least one point and connected to and supported by the fixed body 21 at least one point through the one or more elastic setting parts 23.

Hereinafter, the fixed body 21 provided in the main body 20 will be described in greater detail.

Figure 4:
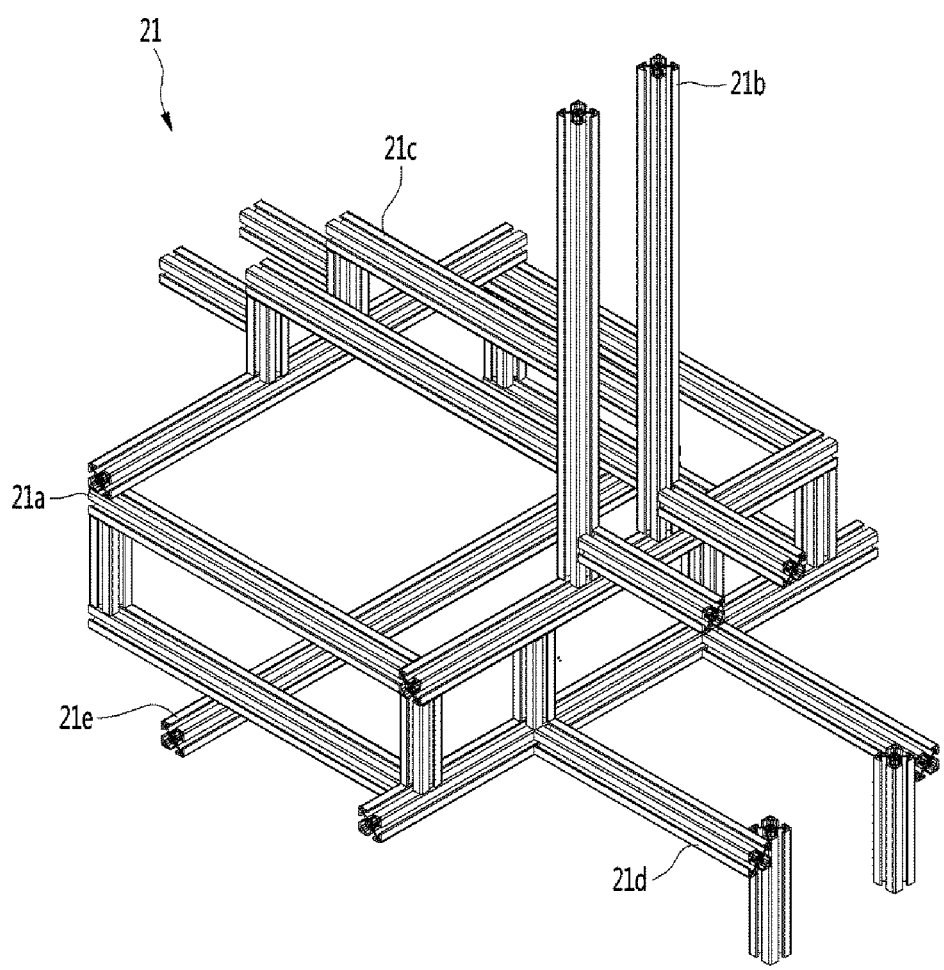
FIG. 4 is a diagram showing a fixed body included in a main body of a cleaning robot according to an embodiment of the present invention.

FIG. 4 is a perspective view showing a fixed body provided in a main body of a cleaning robot according to an embodiment of the present invention.

Referring to FIG. 4, the fixed body 21 may include a main fixed body 21a, a first upper fixed body 21b and a second upper fixed body 21c provided above the main fixed body 21a, a front fixed body 21d provided at the front side of the main fixed body 21a, and a lower fixed body 21e provided below the main fixed body 21a.

The main fixed body 21a may have a plurality of frames fastened to each other to form a three-dimensional structure having a predetermined volume and may form a basic frame of the main body 20. For example, as shown in FIG. 4, the main fixed body 21a may have a plurality of frames fastened to each other to have a rectangular parallelepiped shape but the shape of the main fixed body 21a is not limited to the rectangular parallelepiped shape. At least one plate may be fastened to the exterior of the main fixed body 21a and a battery 210 or a main board of the main body 20 may be provided in or above the main fixed body 21a.

The first upper fixed body 21b and the second upper fixed body 21c may be provided above the main fixed body 21a. The first upper fixed body 21b may include at least one frame extending in a longitudinal direction, and the second upper fixed body 21c may include at least one frame extending in a lateral direction toward the front and rear sides of the cleaning robot 1. For example, the camera unit 24 may be fixed to the first upper fixed body 21b toward the front side of the cleaning robot 1. In addition, the cleaning module 29 of FIG. 2 may be seated in the second upper fixed body 21c. In some embodiments, the cleaning module 29 may be fastened to the first upper fixed body 21b and the second upper fixed body 21c, thereby being more stably fixed.

The front fixed body 21d may be provided at the front side of the main fixed body 21a. A second plate 212, to which an elastic setting part 23a described below with reference to FIG. 5 may be fastened, may be fastened to the front fixed body 21d. In some embodiments, a caster assisting traveling of the traveling parts 26 may be fastened to the lower part of the front fixed body 21d.

The lower fixed body 21e may be provided below the main fixed body 21a. The lower fixed body 21e may include at least one frame extending in a lateral direction toward both lateral sides of the cleaning robot 1. The traveling parts 26 and the suction module 27 may be fastened to the lower fixed body 21e. In some embodiments, the suction module 27 may be fastened to at least one of the main fixed body 21a, the front fixed body 21d, and the lower fixed body 21e.

Figure 5:
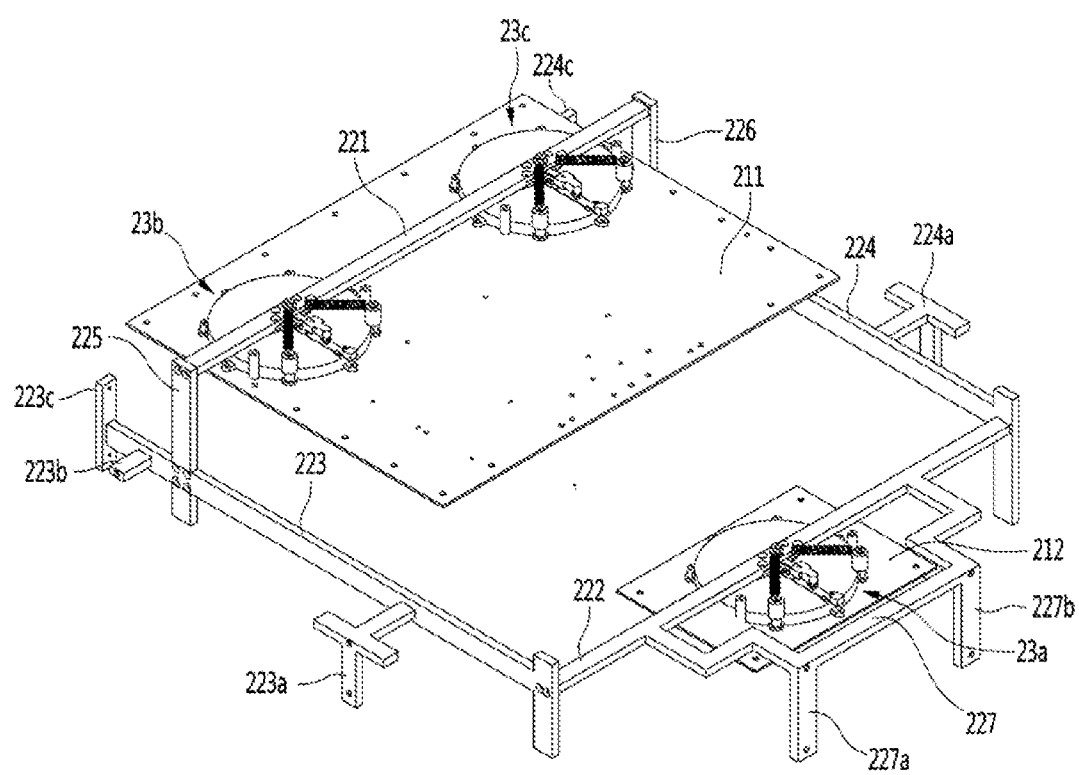
FIG. 5 is a perspective view showing a movement frame and components for fixing the movement frame to a fixed body of a cleaning robot according to an embodiment of the present invention.
Figure 6:
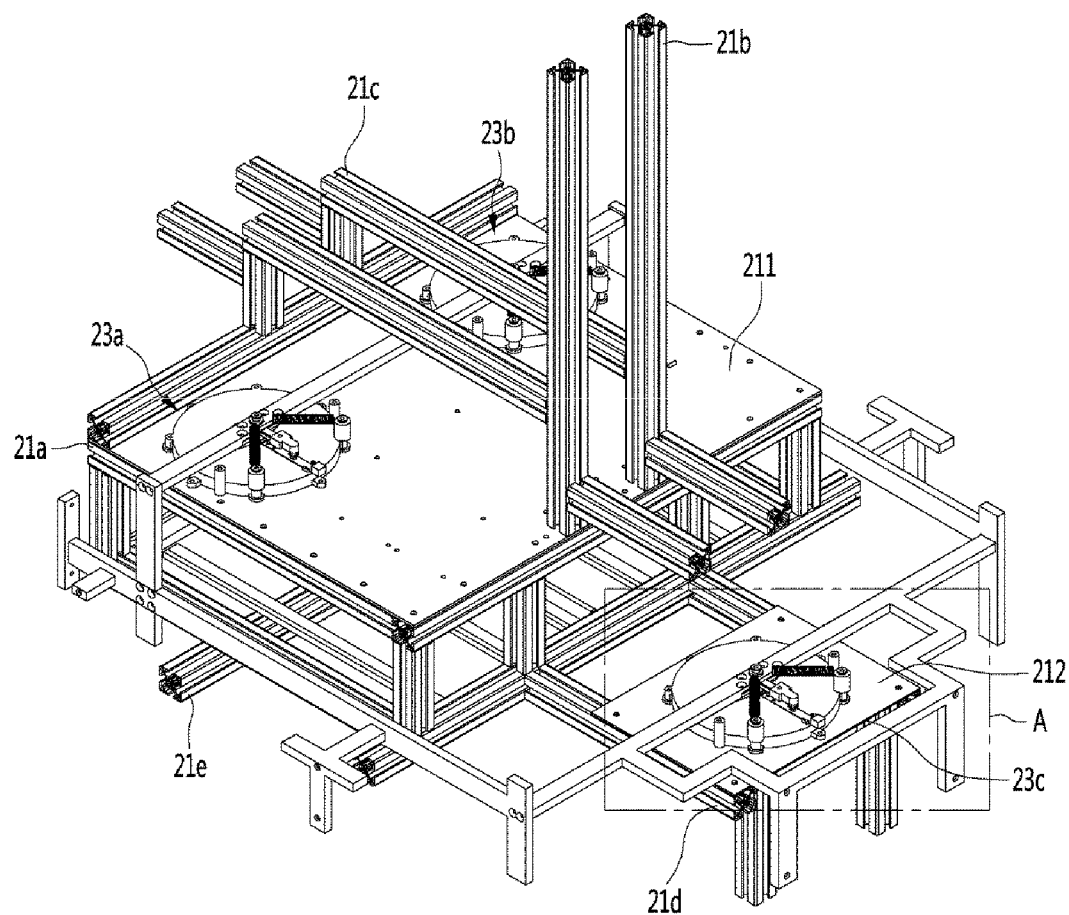
FIG. 6 is a diagram showing a movement frame and a fixed body.

FIG. 5 is a perspective view showing a movement frame and components for fixing the movement frame to a fixed body of a cleaning robot according to an embodiment of the present invention, and FIG. 6 is a perspective view showing a movement frame and a fixed body.

Referring to FIG. 5, the movement frame 22 may include a plurality of frames adjacent to the inner circumferential surface of the cover 10 (e.g., the bottom cover 10c) and located at front, rear and both lateral sides of the center of the cleaning robot 1. For example, the movement frame 22 may include a first frame 221 and a second frame 222 extending in a lateral direction toward both lateral sides of the cleaning robot 1 and a third frame 223 and a fourth frame 224 extending in a lateral direction toward the front and rear sides of the cleaning robot 1. For example, the first frame 221 may be located above the main fixed body 21a, and the second frame 222 may be located at the front side of the main fixed body 21a. In addition, the third frame 223 and the fourth frame 224 may be located at both lateral sides of the main fixed body 21a. In this case, although the movement frame 22 has a rectangular shape when viewed from the top, the shape of the movement frame 22 is not limited thereto.

In some embodiments, based on the arrangements of various components received in the bottom cover 10c and the shape of the fixed body 21, the movement frame 22 may be provided outside the fixed body 21 (specifically, the main fixed body 21a) so as not to be directly brought into contact with the above-described components and the fixed body 21. For example, the height of the first frame 221 from the ground may be different from the heights of the second frame 222 to the fourth frame 224 from the ground. As described below with reference to FIG. 6, the first frame 221 may be located above the main fixed body 21a and the second to fourth frames 222 to 224 may be provided at the front and both lateral sides of the main fixed body 21a. Therefore, the height of the first frame 221 from the ground may be greater than the heights of the second to fourth frames 222 to 224 from the ground.

In this case, the movement frame 22 may include a fifth frame 225 for connecting the first frame 221 and the third frame 223 and a sixth frame 226 for connecting the first frame 221 and the fourth frame 224. In this case, the movement frame 22 may have an "L" shape when viewed from one lateral side.

As in the embodiment shown in FIG. 5, when the movement frame 22 includes first to sixth frames 221 to 226, the first frame 221 may be fastened to the fifth frame 225 and the sixth frame 226, and the second frame 222 may be fastened to the third frame 223 and the fourth frame 224. The third frame 223 may be fastened to the second frame 222 and the fifth frame 225, and the fourth frame 224 may be fastened to the second frame 222 and the sixth frame 226.

In some embodiments, the bottom cover 10c may be formed such that the front side thereof protrudes as compared to the rear and both lateral sides thereof, in order to protect the side brush 15 or the suction module 27 provided at the front lower end of the fixed body 21 or to more efficiently protect the internal components upon colliding with a front obstacle. Therefore, the front side of the bottom cover 10c and the second frame 222 may be spaced apart from each other by a predetermined distance or more. In order to efficiently fasten the front side of the bottom cover 10c and the movement frame 22, the movement frame 22 may further include a seventh frame 227 formed at the front side of the second frame 222.

The movement frame 22 may be fastened to the bottom cover 10c at least one fastening point. However, each of the frames 221 to 226 of the movement frame 22 and the bottom cover 10c are spaced apart from each other by a predetermined distance, such that each of the frames 221 to 226 may not be easily fastened to the bottom cover 10c.

Therefore, the movement frame 22 may further include one or more fastening frames 223a to 223c, 224a to 224c and 227a to 227b connected to any one of the frames 221 to 226, in order to be fastened to the bottom cover 10c.

For example, the first fastening frame 223a and the second fastening frame 223b may be connected to the third frame 223 toward the lateral side (e.g., right side) of the cleaning robot 1. The third fastening frame 223c may be connected to the third frame 223 toward the rear side of the cleaning robot 1. The fourth fastening frame 224a and the fifth fastening frame 224b may be connected to the fourth frame 224 toward the lateral side (e.g., left side) of the cleaning body 1, and the sixth fastening frame 224c may be connected to the fourth frame 224 toward the rear side of the cleaning robot 1. In addition, the seventh fastening frame 227a and the eighth fastening frame 227b may be connected to the seventh frame 227 toward the front side of the cleaning robot 1.

Meanwhile, the fastening frames may be formed at positions symmetrical to each other with respect to a virtual line connecting the front and rear sides of the cleaning robot 1. That is, the first fastening frame 223a and the fourth fastening frame 224a, the second fastening frame 223b and the fifth fastening frame 224b, the third fastening frame 223c and the sixth fastening frame 224c, and the seventh fastening frame 227a and the eighth fastening frame 227b may be formed at positions symmetrical to each other.

The movement frame 22 may be connected to the bottom cover 10c as the plurality of fastening frames 223a to 223c, 224a to 224c and 227a to 227b is fastened to the bottom cover 10c. An example of fastening the fastening frames 223a to 223c, 224a to 224c and 227a to 227b to the bottom cover 10c was described with reference FIG. 3.

Referring to FIGS. 5 and 6, the cleaning robot 1 may include one or more elasticity setting parts 23a to 23c connected to the movement frame 22. As shown in FIG. 5, the elasticity setting part may include a first elasticity setting part 23a connected to the second frame 222 and a second elasticity setting part 23b and a third elasticity setting part 23c connected to the first frame 221.

For example, the elasticity setting parts 23a to 23c may be provided in an acute-angled triangular shape and may be fixed to the fixed body 21 by a first plate 211, to which the second elasticity setting part 23b and the third elasticity setting part 23c are fastened, and a second plate 212, to which the first elasticity setting part 23a is fastened. In some embodiments, the first plate 211 and the second plate 212 may be understood as being included in the fixed body 21. For example, the first plate 211 may be fastened to the main fixed body 21a and the second plate 212 may be fastened to the front fixed body 21d. In this case, the first elasticity setting part 23a may be provided at the front side of the fixed body 21 (specifically, the main fixed body 21a), and the second elasticity setting part 23b and the third elasticity setting part 23c may be provided above the main fixed body 21a to form the acute-angled triangle along with the first elasticity setting part 23a. As a result, the movement frame 22 is connected and supported at three points located in the acute-angled triangular shape of the fixed body 21, thereby stably supporting the cover 10 having a large volume and weight relative to the fixed body 21.

In addition, the elasticity setting parts 23a to 23c may enable the movement frame 22 to freely move relative to the fixed body 21. Therefore, even when the cover 10 and the movement frame 22 move by external force, the fixed body 21 may not move. To this end, the elasticity setting parts 23a to 23c may be connected to the movement frame 22 using an elastic member. This will be described in greater detail below with reference to FIG. 7. Meanwhile, as shown in FIG. 6, the movement frame 22 may be located outside the fixed body 21 (specifically, the main fixed body 21a) in order to avoid direct contact with the fixed body 21 upon movement. In particular, the movement frame 22 and the fixed body 21 may be spaced apart from each other by greater than a predetermined distance and the predetermined distance may correspond to a maximum movement distance of the movement frame 22 and the cover 10.

Figure 7:
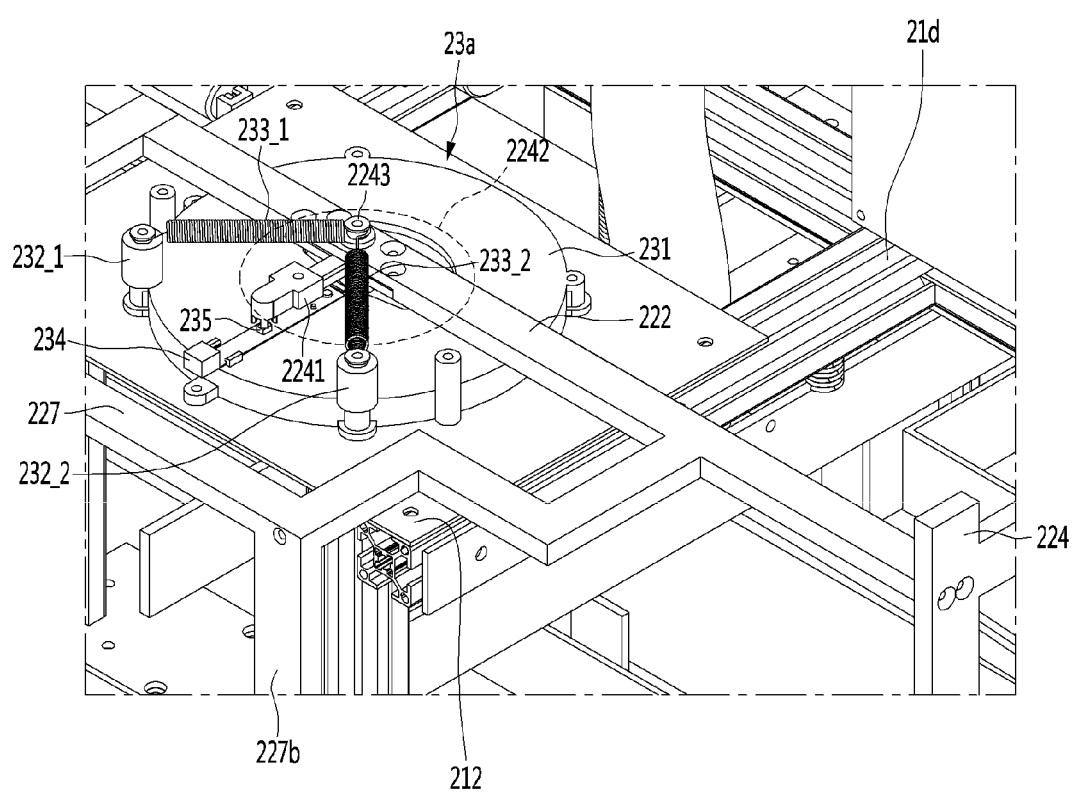
FIG. 7 is a diagram illustrating an elasticity setting part provided between a movement frame and a fixed body of a cleaning robot according to an embodiment of the present invention.

FIG. 7 is a diagram illustrating an elasticity setting part provided between a movement frame and a fixed body of a cleaning robot according to an embodiment of the present invention.

In the following figures, the configuration of the elasticity setting part 23 according to the embodiment of the present invention will be described using the first elasticity setting part 23a provided at the front side of the fixed body 21. However, the configuration of the elasticity setting parts 23b, 23c provided at the lateral rear sides of the fixed body 21 is substantially equal to that of the first elasticity setting part 23a provided at the front side of the fixed body 21.

Referring to FIG. 7, the movement frame 22 (the second frame 222 in the embodiment of FIG. 7) may be connected to an inner body 2242 contacting the upper surface of the second plate 212 fastened to the front fixed body 21d and movably supporting the movement frame 22 relative to the fixed body 21. For example, the inner body 2242 may be implemented in a circular plate shape, without being limited thereto. The inner body 2242 may be located below the second frame 222. The inner body 2242 may be connected to the second frame 222 through a movement shaft 2243 vertically formed with respect to the second frame 222. That is, the movement shaft 2243 may connect the movement frame 22 and the inner body 2242. In this case, when the movement frame 22 moves by external force applied to the cover 10, the inner body 2242 may also move in a horizontal direction.

The first elasticity setting part 23a may include a holder 231 for enabling horizontal movement of the movement frame 22 and disabling vertical movement of the movement frame 22. The holder 231 may be fastened to the second plate 212 of the fixed body 21. A reception space for receiving the inner body 2242 may be formed in the holder 231, and the inner body 2242 may be horizontally moved in the reception space. In order for the inner body 2242 to move in the reception space, the size of the reception space may be greater than that of the inner body 2242.

The holder 231 may include a stopper formed at the upper portion of the reception space. The inner body 2242 received in the reception space may be connected to the movement frame 22 through the movement shaft 2243 passing through the stopper. At this time, in order to prevent the inner body 2242 from escaping from the holder 231, the size of the stopper may be less than that of the inner body 2242. The stopper may be formed to fix the movement frame 22 at a reference position when external force is not applied. In addition, the movement ranges of the bottom cover 10c and the movement frame 22 may be set according to the size of the stopper. As the size of the stopper increases, the movement range of the movement frame 22 may increase and, as the size of the stopper decreases, the movement range of the movement frame 22 may decrease. The stopper will be described in greater detail with reference to FIG. 8.

In some embodiments, the movement ranges of the movement frame 22 and the bottom cover 10c may be set according to the size of the reception space. As the size of the reception space increases, the movement ranges of the bottom cover 10c and the movement frame 22 may increase and, as the size of the reception space decreases, the movement ranges of the bottom cover 10c and the movement frame 22 may decrease.

In addition, the first elasticity setting part 23a may further include elastic members 233_1 to 233_2 to connect the holder 231 and the second frame 222. One ends of the elastic members 233_1 to 233_2 may be connected to spring connection bodies 232_1 and 232_2 coupled to the holder 231 or the edge of the holder 231, and the other ends thereof may be connected to the second frame 222 or the movement shaft 2243 connected to the second frame 222.

The elastic members 233_1 to 233_2 may be returned to the reference position after the movement frame 22 moves by external force. For example, the elastic members 233_1 to 233_2 may be implemented by tension springs.

As shown in FIG. 7, the first elasticity setting part 23a may include the first elastic member 233_1 and the second elastic member 233_2. One end of the first elastic member 233_1 may be connected to the first spring connection body 232_1 and the other end thereof may be connected to the movement shaft 2243. One end of the second elastic member 233_2 may be connected to the second spring connection body 232_2 and the other end thereof may be connected to the movement shaft 2243.

The first elastic member 233_1 and the second elastic member 233_2 may be arranged at a predetermined angle from the movement shaft 2243. The first elastic member 233_1 may pull the movement shaft 2243 forward and to one side and the second elastic member 233_2 may pull the movement shaft 2243 forward and to the other side. The elastic force of the first elastic member 233_1 may be equal to that of the second elastic member 233_2.

As a result, when external force is not applied to the bottom cover 10c, the movement shaft 2243 may be located at the reference position between the first elastic member 233_1 and the second elastic member 233_2 by a combination of elastic forces of the first elastic member 233_1 and the second elastic member 233_2.

When the bottom cover 10c moves by collision with an obstacle or by external force, the elastic members 233_1 to 233_2 may be stretched to absorb external force when the movement frame 22 moves. Accordingly, the external force applied to the fixed body 21 may be minimized. In addition, the elastic members 233_1 to 233_2 may be compressed after being stretched and the cover 10 and the movement frame 22 may be returned to the reference position. In addition, the cover 10 may not move by the elastic members 233_1 to 233_2 when the applied external force is less than a reference level. Therefore, it is possible to solve instability that the cover 10 moves by even small force.

Although the first elasticity setting part 23a includes two elastic members 233_1 to 233_2 in FIG. 7, the number of elastic members may be changed according to embodiment. In addition, the elastic member may be implemented by various components (e.g., a damper, etc.) for returning the movement frame 22 to a specific position instead of the tension spring.

In some embodiments, the first elasticity setting part 23a may further include a sensor module 234 for sensing movement of the bottom cover 10c. For example, the sensor module 234 may include a Hall sensor 235. The Hall sensor means a sensor for sensing change in magnetic field using the Hall effect. In this case, the movement frame 22 may be connected to a magnetic fixing part 2241 for fixing a magnetic material 2245 (see FIG. 12) for generating a magnetic field. As the magnetic material 2245 moves, the magnetic field is changed. The sensor 235 may sense movement of the bottom cover 10c by sensing change in magnetic field.

Figure 8:
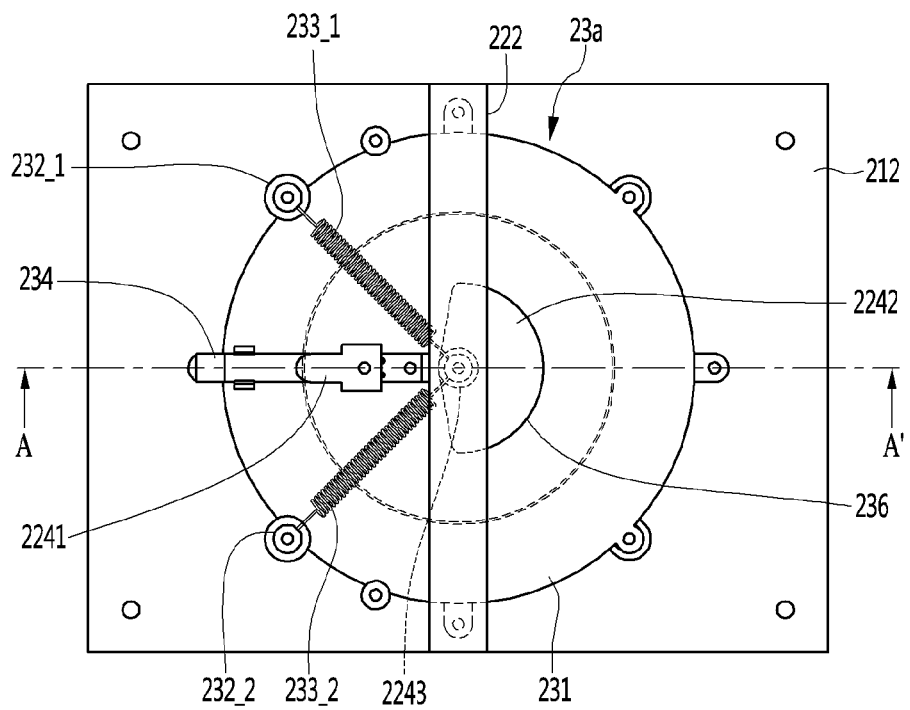
FIG. 8 is a plan view of the elasticity setting part shown in FIG. 7.
Figure 9:
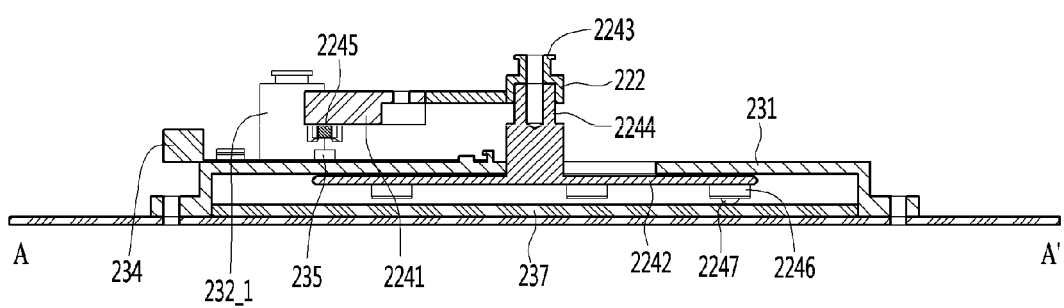
FIG. 9 is a cross-sectional view of the elasticity setting part, taken along line A-A'.
Figure 10:
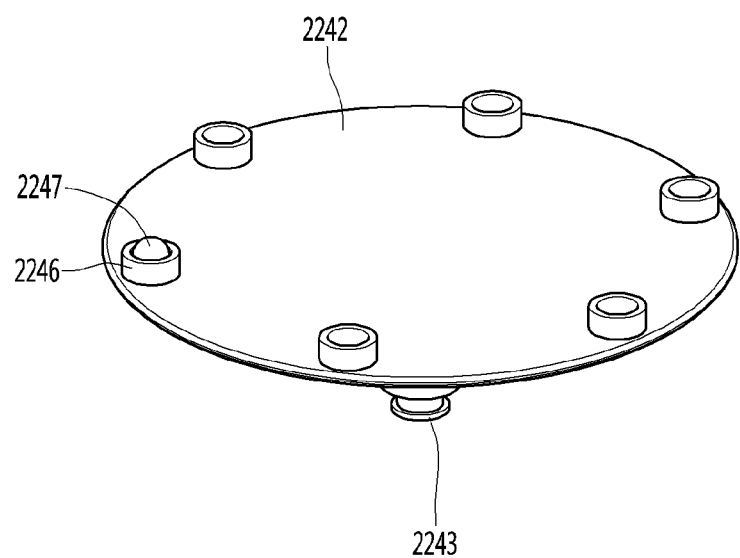
FIG. 10 is a diagram showing an example of an inner body connected to a movement frame.

FIG. 8 is a plan view of the elasticity setting part shown in FIG. 7, and FIG. 9 is a cross-sectional view of the elasticity setting part, taken along line A-A'. FIG. 10 is a diagram showing an example of an inner body connected to a movement frame.

Referring to FIG. 8, the first elasticity setting part 23a may include a stopper 236. The stopper 236 may be formed at the upper side of the reception space of the holder 231. For example, the stopper 236 may have a fan shape. The central angle of the fan-shaped stopper is less than 180° and the arc of the fan-shaped stopper may correspond to a minor arc. As described above, the size of the stopper 236 may be less than the size of the inner body 2242. Accordingly, the inner body 2242 can be prevented from being escaping from the holder 231 by external force applied to the cover 10 and the movement frame 22.

As shown in FIG. 8, the movement shaft 2243 of the movement frame 22 (e.g., the second frame 222)) may be pulled by the elastic members 233_1 to 233_2 to be fixed to the center of the fan-shaped stopper 236. That is, when external force is not applied, since the movement shaft 2243 is fixed to the fan-shaped stopper 236, the movement shaft 2243 may not move. Accordingly, the movement frame 22 and the cover 10 fixed to the movement frame 22 may be stably fixed without shaking or trembling.

Referring to FIGS. 8 and 10, when the inner body 2242 moves within the reception space of the holder 231, friction with the second plate 212 contacting the bottom of the inner body 2242 needs to be minimized. Therefore, a rotator reception part 2246 and a rotator 2247 may be formed on the bottom of the inner body 2242.

The rotator reception part 2246 may include a plurality of rotator reception parts provided along the exterior of the bottom of the inner body 2242.

The rotator 2247 may be provided on the bottom of the inner body 2242 to rotate in correspondence with movement of the cover 10 and the movement frame 22. As shown in FIGS. 9 and 10, the rotator 2247 may be implemented by a ball. However, the rotator 2247 is not limited thereto and may be implemented by a rotatable component such as a roller. In some embodiments, if a plurality of rotator reception parts 2246 is provided on the bottom of the inner body 2242, the rotator 2247 may be received in at least one of the plurality of rotator reception parts 2246.

For example, if the rotator 2247 is implemented by a ball, the rotator reception part 2246 may be formed in a cylindrical shape to form a reception space therein. The diameter of the rotator reception part 2246 may be equal to or greater than that of the ball. Meanwhile, the height of the rotator reception part 2246 may be less than the diameter of the ball. Accordingly, the lower portion of the ball may not be received in the reception space of the rotator reception part 2246 and may be partially exposed. That is, at least one of the rotator 2247 may be exposed to the lower part of the rotator reception part 2246.

In this case, when the inner body 2242 connected to the movement frame 22 moves by external force, the rotator 2247 rotates within the rotator reception part 2246 to reduce friction between the inner body 2242 and the second plate 212. As friction between the inner body 2242 and the second plate 212 is reduced, the inner body 2242 may more smoothly move. In some embodiments, in order to reduce friction between the rotator 2247 and the rotator reception part 2246 when the rotator 2247 rotates, a lubricant (e.g., grease, etc.) may be applied between the rotator reception part 2246 and the rotator 2247. That is, the rotator reception part 2246 and the rotator 2247 are provided on the bottom of the inner body 2242, thereby preventing the second plate 212 from moving or preventing the cover 10 from not naturally moving by friction between the inner body 2242 and the fixed body 21.

Meanwhile, the inner body 2242 is responsible for substantially supporting the cover 10 and the movement frame 22 relative to the fixed body 21 or the second plate 212. In order to endure the weight of the cover 10 and the movement frame 22, the inner body 2242 requires a predetermined level or more of rigidity. Therefore, for example, the inner body 2242 may be made of an aluminum material. However, the material of the inner body 2242 is not limited thereto and the inner body 2242 may be made of various metal materials with a predetermined level or more of rigidity.

In addition, in some embodiments, a flow layer 237 may be further provided between the fixed body 21 (or the second plate 212) and the inner body 2242 (the rotator reception part 2246 or the rotator 2247). The flow layer 237 may be provided in the reception space of the holder 231. The flow layer 237 may be made of a material having small surface friction (e.g., polyoximethylene (POM) or acrylonitrile butadiene styrene (ABS), etc.) in order to reduce friction with the inner body 2242, such that the cover 10 and the movement frame 22 may more smoothly move upon applying external force.

Hereinafter, operation of the elasticity setting part 23 and the inner body 2242 upon applying external force to the cleaning robot 1 will be described with reference to FIGS. 11 and 12.

Figure 11:
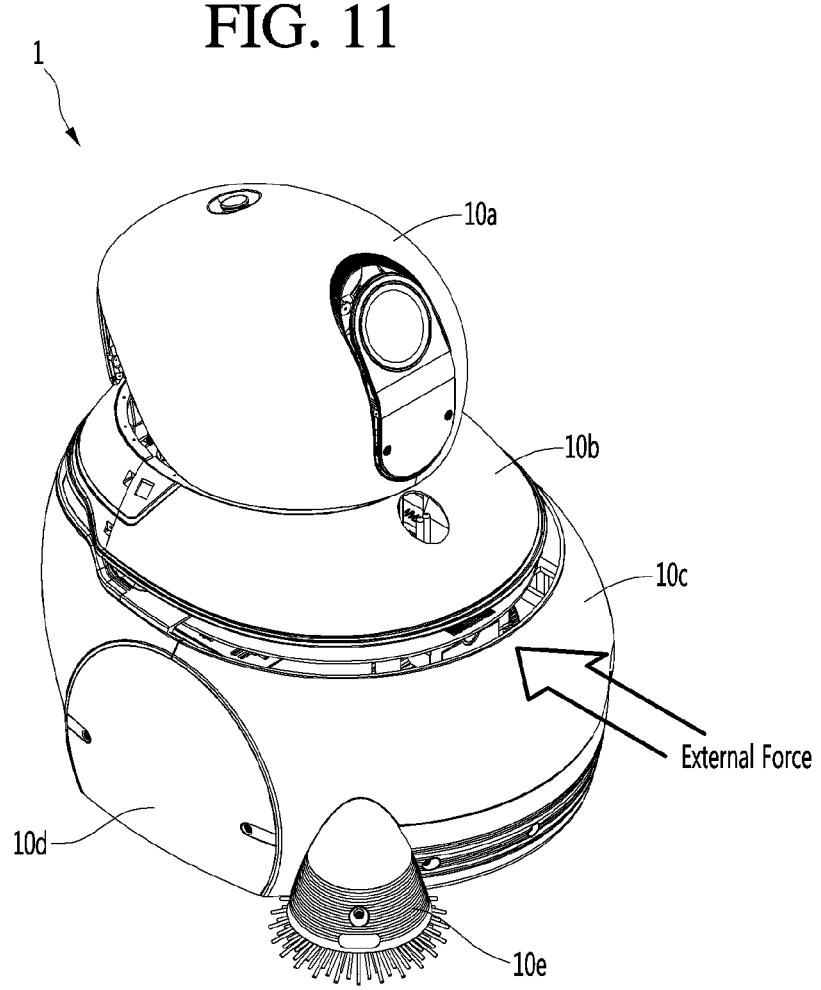
FIGS. 11 and 12 are diagrams illustrating operation of the elasticity setting part and the inner body upon applying external force due to collision with an obstacle.
Figure 12:
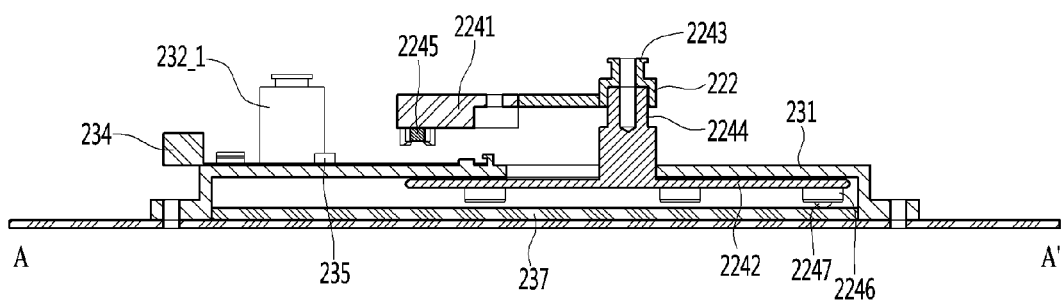

FIGS. 11 to 12 are diagrams illustrating operation of the elasticity setting part and the inner body upon applying external force due to collision with an obstacle.

Referring to FIGS. 11 and 12, while the cleaning robot 1 travels or stops, external force may be applied to the front side of the cleaning robot 1 (for example, the front side of the cleaning robot 1 collides with an obstacle).

In this case, the cover 10 may move backward by the applied external force. Since the cover 10 moves backward, the movement frame 22 connected to the cover 10 may also move backward. Since the movement frame 22 moves backward, the movement shafts 2243 and 2244 and the inner body 2242 connected to the second frame 222 of the movement frame 22 may also move backward. That is, through comparison between FIGS. 9 and 12, it can be seen that the inner body 2242 and the movement shafts 2243 and 2244 move backward.

When the inner body 2242 moves backward, the rotator 2247 provided on the bottom of the inner body 2242 rotates, thereby minimizing friction between the inner body 2242 and the fixed body 21 (or the second plate 212). In addition, friction may be minimized by the flow layer 237 formed between the inner body 2242 and the fixed body 21 (or the second plate 212).

In addition, as shown in FIG. 11, when external force is applied to the cleaning robot 1, at least one of the elastic members 233_1 to 233_2 may be stretched and the movement frame 22 and the components connected thereto may be moved.

When external force is no longer applied, the stretched elastic members 233_1 to 233_2 may be compressed. As the elastic members 233_1 to 233_2 are compressed, the movement shafts 2243 and 2244 connected to the movement frame 22 may be returned to the reference position. Therefore, the movement frame 22, the inner body 2242 and the cover 10 may be returned to the reference position. When the inner body 2242 is returned to the reference position, friction is minimized by the rotator 2247 provided on the bottom of the inner body 2242 and/or the flow layer 237. Accordingly, the inner body 2242 may be smoothly returned to the reference position.

That is, the cleaning robot 1 according to the embodiment of the present invention may support the cover 10 and the movement frame 22 relative to the fixed body 21, using the inner body 2242 connected to the cover 10 and the movement frame 22. In particular, the rotator 2247 such as the ball is provided on the bottom of the inner body 2242, such that the inner body 2242 and the cover 10 and the movement frame 22 connected thereto may be smoothly moved relative to the fixed body 21 upon applying external force. That is, the cover 10 may more efficiently perform bumping operation by the applied external force.

In addition, the flow layer 237 made of a material having small surface friction is provided between the inner body 2242 and the fixed body 21, such that the movement frame 22 and the cover 10 connected to the inner body 2242 may be more naturally moved upon applying external force.

The cleaning robot according to the embodiment of the present invention can movably support the cover and the movement frame relative to the fixed body using the inner body connected to the movement frame fastened to the cover. In particular, the rotator may be provided on the bottom of the inner body to rotate the rotator when external force is applied to the cover, thereby reducing friction between the inner body and the fixed body. Accordingly, since the inner body more smoothly moves relative to the fixed body, bumping operation of the cover can be more efficiently performed.

In addition, since the flow layer made of a material having small surface friction is provided between the inner body and the fixed body, when the inner body moves by external force applied to the cover, friction between the inner body and the fixed body can be reduced, thereby efficiently performing bumping operation of the cover.

Since the bumping operation of the cover can be efficiently performed, the cleaning robot can efficiently protect various parts or components included in the main body upon collision or upon applying external force. In addition, if bumping operation is efficiently performed, impact applied to an obstacle or person colliding with the cleaning robot can be reduced. Accordingly, since damage of the obstacle or person is reduced, stability of the cleaning robot can be improved.

What is claimed is:

1. A robot comprising:
    a fixed body;
    a plurality of wheels provided at a lower portion of the fixed body to enable the robot to move along a floor surface to clean said floor surface;
    a cover surrounding the fixed body, the cover configured to form an appearance of the robot;
    a movement frame coupled to an inner surface of the cover, the movement frame being movable together with the cover with respect to the fixed body when an external force is applied to the cover;
    a plate provided on the fixed body;
    a holder coupled to an upper side of the plate, the holder having a reception space therein;
    a sensor for detecting movement of the movement frame, the sensor being located on the holder;
    an opening formed on an upper surface of the holder;
    an inner body being movable in the reception space of the holder;
    a movement shaft connecting the movement frame to the inner body through the opening;
    a rotator provided on a bottom side of the inner body, the rotator being configured to rotate upon movement of the cover to reduce friction between the inner body and the plate; and
    a rotator reception part provided on the bottom side of the inner body to receive the rotator,
    wherein at least a portion of the rotator is exposed through a lower portion of the rotator reception part in order to contact an upper surface of the plate.

2. The robot according to claim 1, further comprising a lubricant applied between the rotator reception part and the rotator.

3. The robot according to claim 1, wherein the rotator reception part includes a plurality of rotator reception parts provided along an outer periphery of the bottom side of the inner body.

4. The robot according to claim 1, wherein the inner body is made of an aluminum material.

5. The robot according to claim 1, further comprising a flow layer provided between the rotator and the plate to support weight of the cover and the movement frame and to reduce friction between the rotator and the plate.

6. The robot according to claim 5, wherein the flow layer is provided in the reception space.

7. The robot according to claim 5, wherein a material of the flow layer includes any one of polyoximethylene (POM) and acrylonitrile butadiene styrene (ABS).

8. The robot according to claim 1, further comprising at least one elastic member configured to absorb the external force applied to the cover as elastic deformation,
    wherein one end of the at least one elastic member is connected to the holder or a spring connection body coupled to an edge of the holder, and
    wherein an other end of the at least one elastic member is connected to the movement frame or the movement shaft.

9. The robot according to claim 8, wherein the opening is a fan-shaped opening, and
    the at least one elastic member is configured to pull the movement shaft so that the movement shaft is fixed to the center of the fan-shaped opening.

10. The robot according to claim 9, wherein the at least one elastic member comprises a first elastic member and a second elastic member forming an acute angle from the movement shaft.

11. The robot according to claim 1, further comprising:
    a suction part provided at the fixed body to suck foreign materials from the floor surface; and
    a side brush protruding from a front lower end of the cover.

12. The robot according to claim 1, wherein a size of the opening is less than that of the inner body.

13. The robot according to claim 1, wherein the opening is a fan-shaped opening, and
    wherein a central angle of the fan-shaped opening is less than 80 degrees.

14. A robot comprising:
    a fixed body;
    a plurality of wheels provided at a lower portion of the fixed body to enable the robot to move along a floor surface to clean said floor surface;
    a cover surrounding the fixed body, the cover configured to form an appearance of the robot;
    a movement frame coupled to an inner surface of the cover, the movement frame being movable together with the cover with respect to the fixed body when an external force is applied to the cover;
    a plate provided on the fixed body;
    a holder coupled to an upper side of the plate, the holder having a reception space therein;
    a sensor for detecting movement of the movement frame, the sensor being located on the holder;
    an opening formed on an upper surface of the holder;
    an inner body being movable in the reception space of the holder;
    a movement shaft connecting the movement frame to the inner body through the opening;
    a rotator provided on a bottom side of the inner body, the rotator being configured to rotate upon movement of the cover to reduce friction between the inner body and the plate;
    a rotator reception part provided on the bottom side of the inner body to receive the rotator; and
    a flow layer provided between the inner body and the plate to support weight of the cover and the movement frame and to reduce friction between the inner body and the plate upon movement of the cover,
wherein at least a portion of the rotator is exposed through a lower portion of the rotator reception part in order to contact an upper surface of the plate.

15. The robot according to claim 14, further comprising:
a suction part provided at the fixed body to suck foreign materials from the floor surface; and
a side brush protruding from a front lower end of the cover.

16. The robot according to claim 14,
wherein the flow layer is provided in the reception space.

17. The robot according to claim 14, wherein a material of the flow layer includes any one of polyoximethylene (POM) and acrylonitrile butadiene styrene (ABS).

18. The robot according to claim 14,
wherein the flow layer is provided on the upper surface of the plate.

19. The robot according to claim 14, further comprising at least one elastic member configured to absorb the external force applied to the cover as elastic deformation,
wherein one end of the at least one elastic member is connected to the holder or a spring connection body coupled to an edge of the holder, and
wherein an other end of the at least one elastic member is connected to the movement frame or the movement shaft.

20. The robot according to claim 19, wherein the opening is a fan-shaped opening, and
wherein the at least one elastic member is configured to pull the movement shaft so that the movement shaft is fixed to the center of the fan-shaped opening.

21. The robot according to claim 20, wherein the at least one elastic member comprises a first elastic member and a second elastic member forming an acute angle from the movement shaft.

22. The robot according to claim 14, wherein the size of the opening is less than that of the inner body.

23. The robot according to claim 14, wherein the opening is a fan-shaped opening, and
wherein a central angle of the fan-shaped opening is less than 180 degrees.

24. A robot comprising:
a fixed body;
a plurality of wheels provided at a lower portion of the fixed body to enable the robot to move along a floor surface to clean said floor surface;
a cover surrounding the fixed body, the cover configured to form an appearance of the robot;
a movement frame coupled to an inner surface of the cover, the movement frame being movable together with the cover with respect to the fixed body when an external force is applied to the cover;
a plate provided on the fixed body;
a holder coupled to an upper side of the plate, the holder having a reception space therein;
a sensor for detecting movement of the movement frame, the sensor being located on the holder;
an opening formed on an upper surface of the holder;
an inner body being movable in the reception space of the holder;
a movement shaft connecting the movement frame to the inner body through the opening;
a plurality of rotators provided on a bottom side of the inner body, the rotators being configured to rotate upon movement of the cover;
a rotator reception part provided on the bottom side of the inner body to receive the plurality of rotators;
a flow layer provided on an upper surface of the plate to support weight of the cover and the movement frame and to reduce friction between the rotators and the plate upon movement of the cover; and
at least one elastic member connected between the movement frame and the holder, the elastic member configured to absorb the external force applied to the cover as elastic deformation,
wherein at least a portion of the rotator is exposed through a lower portion of the rotator reception part in order to contact the upper surface of the plate.

25. The robot according to claim 24, wherein the size of the opening is less than that of the inner body.

26. The robot according to claim 24, wherein the opening is a fan-shaped opening, and
wherein a central angle of the fan-shaped opening is less than 180 degrees.

27. The robot according to claim 24, wherein the opening is a fan-shaped opening, and
wherein the at least one elastic member is configured to pull the movement shaft so that the movement shaft is fixed to the center of the fan-shaped opening.

28. The robot according to claim 27, wherein the at least one elastic member comprises a first elastic member and a second elastic member forming an acute angle from the movement shaft.

* * * * *